United States Patent

Cox et al.

[11] Patent Number: 5,980,695
[45] Date of Patent: Nov. 9, 1999

[54] APPARATUS FOR VACUUM DISTILLATION OF SOLVENTS

[75] Inventors: Jeffory David Cox, Houston; Robert Grayson Martin, Crosby, both of Tex.

[73] Assignee: TransGlobal Industrial Services, Inc., Houston, Tex.

[21] Appl. No.: 08/748,661

[22] Filed: Nov. 14, 1996

[51] Int. Cl.[6] .................................................. B01D 3/10
[52] U.S. Cl. ..................... 202/166; 202/177; 202/180; 202/181; 202/182; 202/185.1; 202/191; 202/193; 202/194; 202/205
[58] Field of Search .................................. 202/163, 166, 202/177, 180, 181, 182, 185.1, 190, 191, 193, 194, 205, 267.1

[56] References Cited

U.S. PATENT DOCUMENTS

| 3,425,235 | 2/1969 | Cox | 202/205 |
|---|---|---|---|
| 4,038,155 | 7/1977 | Reber | 202/170 |
| 4,204,913 | 5/1980 | Sabatka | 202/168 |
| 4,537,660 | 8/1985 | McCord | 202/170 |
| 4,762,593 | 8/1988 | Youngner | 202/186 |
| 4,770,748 | 9/1988 | Cellini et al. | 202/185.1 |
| 4,929,312 | 5/1990 | Westcott | 203/2 |
| 5,173,155 | 12/1992 | Miyata et al. | 202/205 |
| 5,312,524 | 5/1994 | Barcomb | 202/177 |
| 5,338,409 | 8/1994 | Heierli | 202/205 |
| 5,446,344 | 8/1995 | Lindke | 202/205 |
| 5,565,070 | 10/1996 | Doi et al. | 203/91 |

Primary Examiner—Nina Bhat
Attorney, Agent, or Firm—Hazel & Thomas

[57] ABSTRACT

A system for the vacuum distillation of contaminated solvents incorporates a tank for holding a liquid contaminated solvent, a heating chamber surrounding the tank for heating the liquid contaminated solvent into an evaporated solvent, a drift elimination and fractionation device for separating contaminants out of the evaporated solvent, a heat exchanger circuit for cooling the evaporated solvent from the drift elimination and fractionation device, a pump circuit connected to receive the evaporated solvent from the drift elimination and fractionation device and to circulate the evaporated solvent through the heat exchanger circuit, and a control circuit connected to at least the heating element and the pump so as to control operation their based on parameters of a solvent selected to be processed. The control circuit includes a plurality of sensors for monitoring operating conditions of at least the tank, the heating chamber and the heat exchanger circuit. The heating chamber is filled with a first heat transfer fluid and has a heating element for generating heat to be transferred to the tank. The heat exchanger circuit has a second heat transfer fluid circulating through it. In operation, the contaminated liquid solvent is evaporated, contaminants from the evaporated solvent are removed, the evaporated solvent is condensed into a clean liquid solvent, and at least the steps of evaporating the contaminated liquid solvent and of circulating the evaporated solvent through a first heat exchanger are controlled by monitoring operating conditions during those steps and conducting the steps based on the monitored operating conditions.

24 Claims, 9 Drawing Sheets

APPARATUS FOR VACUUM DISTILLATION OF SOLVENTS

BACKGROUND OF THE INVENTION

1. Scope of the Present Invention

The present invention is directed to the method and apparatus for the vacuum distillation and recovery of solvents used in industrial processes. In particular, the present invention embodies an automated system wherein large quantities of solvent can be processed and recovered either in a continuous or batch-wise operation.

2. Description of the Prior Art

The process for the distillation of solvents for purposes of recovering solvents has been known in the art for many years. There are possibly dozens of companies world wide who manufacture the equipment intended for this use. However, most such companies, if not all, employ the same technology, or combinations of technologies currently used in distillation to implement their particular implementations or applications of the general process.

Portable solvent recovery machines generally incorporate a vessel, usually thermally insulated for efficiency, with a heating element or heating source of some type (e.g., an electric heating element). Most such vessels are cylindrical in shape and house the electric heating element immersed in a bath of thermal oil for even, and most important, safe heat transfer. Variations of such machines include those with rectangular vessels or encapsulated heating elements, which eliminates the need for thermal oil. There are also machines that use steam produced in-house and piped through tube bundles for heating the solvent to its boiling point.

In a typical operation, when the vessel heats the solvent to its boiling point, the vessel allows the solvent vapor to exit, thus leaving contaminants behind. After leaving the boiling vessel, the solvent vapor then passes through a condenser or heat exchanger to change the solvent vapor back into a liquid. Such condensers or heat exchangers range from simple water jackets to refrigerated shell and tube bundles. The medium used for removing the heat from the condensers is usually water. The source varies from ordinary tap water lines, cooling tower lines, or condensing water lines.

Some portable distillation devices utilize vacuum systems to assist in distillation. Depending on the type and performance of the vacuum system, it can lower the boiling point of most solvents by 100 degrees Fahrenheit or more. Most solvent recovery units on the market today that incorporate vacuum systems actually create a negative pressure on a self-contained process. This means that, once an operator fills the solvent recovery system with dirty solvent, the machine then creates a vacuum on the entire process until all of the solvent is refined. After this is accomplished, the operator usually stops the machine, breaks the vacuum, drains or pumps out the clean solvent, refills the unit with dirty solvent and starts again. This is typically referred to as a vacuum assisted "batch process."

More sophisticated vacuum assisted distillation units offer a "continuous process" feature. In such units, the vacuum system maintains a negative pressure on the vessel and vapor side and a positive pressure on the newly condensed clean solvent line. This allows the operator to do hundreds of gallons of solvent without interruption or down time. This can be achieved by using a jet-pump type system or a liquid ring vacuum system.

The methods used in controlling and monitoring the various aspects of conventional machines, as described above, are usually very similar, although there are some slight variations. Many of the older models use a mechanical thermostat built into the heating element to control the upper limit of the heating oil. By setting an upper limit on the heating oil, the operator can distill a selected solvent at temperatures well below auto-ignition. Systems incorporating this simplified technology usually rely on a timer or frequent operator attention in order to detect when production has ceased. Timers as used in the art have been found to rarely provide accurate predictions of process completions.

Different types and quantities of contaminants will vary the length of the distillation cycle for any given solvent. Typically, the operator has to perform numerous trial runs with varying levels of solid contents to establish a smooth routine. Incorrect cycle timings can, however, cause premature inner tank inspections resulting in potential VOC emissions, or at best, require annoyingly difficult still-bottom removal operations.

Applicant has found that measuring and controlling the heating oil temperature, in conjunction with measuring and controlling the solvent vapor temperature is a far better technique for controlling and monitoring the overall solvent distillation and recovery operation. The importance of being able to read and control the vapor temperature cannot be overstated. Applicant has further found that increases and decreases of vapor and oil temperatures do not always parallel each other. When a distillation cycle begins, the temperatures of the heating oil and the dirty solvent begin to rise uniformly. The vapor temperature remains relatively ambient, disregarding moderate conditional heat transfer, until initial signs of clean solvent production appear.

As the production of the clean solvent progresses, the vapor temperature quickly responds, climbing in a manner proportionately similar to the rise in heating oil temperature. During a "continuous process" or during initial stages of a "batch process," vapor temperatures can easily be controlled by limits set on the heating system. However, during the final stages of either a "batch" or "continuous" process, vapor temperatures begin to change disproportionately relative to the heating system.

As the temperature of the solvent vapor in the heating vessel drops significantly, the amount or quantity of solvent vapor, or its product, decreases as well. When this occurs, the distillation system's ability to remove the heat through vaporization is impaired, thus resulting in dramatic increases in vapor temperatures, even though the upper limits of the heating system are satisfied.

In applications where precise sensing is used in distilling solvents that contain nitrocellulose or chlorine, the existence of uncontrollable vapor temperatures can be very critical. Nitrocellulose solvents, commonly used in the printing industry, auto-ignite at 235° Fahrenheit, and therefore must be accurately monitored during recovery. Most chlorinated solvents used in the U.S. dry-cleaning industry have been carefully formulated to allow safe use and safe reclamation, if distilled properly. However, the reclamation of those chlorinated solvents require that the vapor temperatures be closely regulated to insure that destructively high temperatures do not occur. If such temperatures were to occur, the integrity of the stabilization process done during the formulation of the chlorinated solvent can be compromised. As a result, free chlorine molecules that may be harmful to people and/or the atmosphere can be generated. Excessively high vapor temperatures can also damage the formulations of "blended" solvents, such as Varsol®, resulting in solvents which are no longer suitable for their intended purpose.

A major problem with distillation units today is operator intervention. Too many units require frequent operator intervention to insure that the distillation process is performing properly. This is due mainly to the equipment's inability to perform control logic, or reason. Applicant has found that on-board programmable logic controllers (PLCs) or even microprocessors, in conjunction with proper temperature and pressure sensing, would greatly reduce or eliminate this problem. However, in order to achieve closed-loop solvent distillation, units incorporating automated control systems would need to control and/or monitor dirty solvent availability, filter cleanliness, automatic shut down, system diagnostics, and continuous feed capabilities.

In other applications of solvent distillation and recovery processes, government safety and/or environmental regulations require that the hydrocarbons in the still-bottom residues be removed in order to render the contaminants landfill ready if the contaminants themselves are to be classified as nonhazardous. On the other hand, residues that are classified as hazardous may require some fluidity for optimum removal or reasonable BTU values for economic incineration.

As shown above, there exist numerous considerations in the design of the structure and operation of solvent distillation and recovery systems. In addition to such design considerations as those discussed above, further considerations include the incorporation of energy efficient heating components, substantial insulation properties, proper heat exchange equipment and sizing, quality component materials and multiple safety back up systems, and the elimination of dangerously hot components exposed to the operator. Unfortunately, most manufacturers of conventional solvent distillation and recovery systems do not conform to all of these essential requirements.

Consequently, there exists a need for a solvent distillation and recovery system that does incorporate features based on all of the above considerations. In particular, there exists a need for an automated solvent distillation and recovery system that allows the user to selectively operate the system according to the specific requirements of the particular solvent and contaminants being processed.

At the same time, there exists a need for a solvent distillation and recovery system that can be operated in either a continuous or "batch-type" process, that monitors and controls the heating element and solvent vapor temperatures, and that can accommodate the specific requirements for processing different solvents and different contaminants.

Further, there exists a need for a solvent distillation recovery system that incorporates energy efficient heating components, exhibits effective insulation properties, utilizes effective properly sized heat exchange equipment, uses quality component materials and multiple safety back up systems, and isolates the operator from dangerously hot components.

SUMMARY OF THE INVENTION

To overcome the problems and shortcomings in the prior art as illustrated above, a main object of the present invention is to provide a process and system for the automated vacuum distillation and recovery of solvents.

Another object of the present invention is to provide a system that allows the user to selectively operate the system according to the specific requirements of the particular solvent and contaminants being processed.

A further object of the present invention is to provide a system that allows operation in either a continuous or "batch-type" process, monitoring and controlling of the heating element and solvent vapor temperatures, and the adaptability to accommodate the requirements specific to processing different solvents and different contaminants.

Among the features of the present invention, the automation of the system, such as by using an on-board PLC, allows the system to perform numerous advantageous functions. For example, an operator is given the ability to select from multiple selections on a control display board. These selections have associated heating and vapor temperatures preprogramed for that particular solvent. This prevents the inputting of incorrect data and operating parameters by an inexperienced operator that may have in potentially dangerous results. By monitoring associated solvent conditions, the system of the present invention can initiate an emergency shut down if an operator distills a solvent dangerously different from the one selected. The automation of the present invention further allows the manipulation of program logic to control filter and solvent statuses, solvent availability, irregular signal conditions, possible VOC emissions, and the integrity of still-bottom residues.

In view of the above objects, the present invention in at least one aspect is directed to a system for recovering contaminated solvents that incorporates means for evaporating a contaminated liquid solvent to be recovered into a clean evaporated solvent, means for condensing the clean evaporated solvent into a clean liquid solvent, and means for controlling operation of the evaporating means and the condensing means based on a type of the contaminated liquid solvent selected to be recovered. The control means includes means for monitoring operating conditions of the evaporating means and the condensing means during recovery processing of the selected contaminated liquid solvent. The evaporating means includes a tank for holding the solvent to be recovered and a heat source for heating the solvent in the tank into evaporation. The condensing means includes a heat exchanger for cooling the clean evaporated solvent into condensation.

In a more detailed aspect, the present invention is directed to a system for the vacuum distillation of contaminated solvents that incorporates a tank for holding a liquid contaminated solvent to be processed, a heating chamber surrounding the tank for heating the liquid contaminated solvent in the tank into an evaporated solvent, a drift elimination and fractionation device for separating contaminants out of the evaporated solvent from the tank, a heat exchanger circuit for cooling the evaporated solvent from the drift elimination and fractionation device, a pump circuit operatively connected to receive the evaporated solvent from the drift elimination and fractionation device and to circulate the evaporated solvent through the heat exchanger circuit, and a control circuit operatively connected to at least the heating element and the pump so as to control operation thereof based on parameters of a solvent selected to be processed. The control circuit includes a plurality of sensors for monitoring operating conditions of at least the tank, the heating chamber and the heat exchanger circuit. The heating chamber is filled with a first heat transfer fluid and has a heating element for generating heat to be transferred through the heat transfer fluid to the tank, while the heat exchanger circuit has a second heat transfer fluid circulating through it.

In a further aspect, the present invention is directed to a method of recovering solvents. The steps of the method include providing a contaminated liquid solvent to be processed, evaporating the contaminated liquid solvent into an evaporated solvent, removing contaminants from the evaporated solvent, condensing the evaporated solvent into a clean liquid solvent, and controlling at least the steps of evaporating the contaminated liquid solvent and of circulating the evaporated solvent through a first heat exchanger by monitoring operating conditions during the steps and conducting the steps based on the monitored operating conditions.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
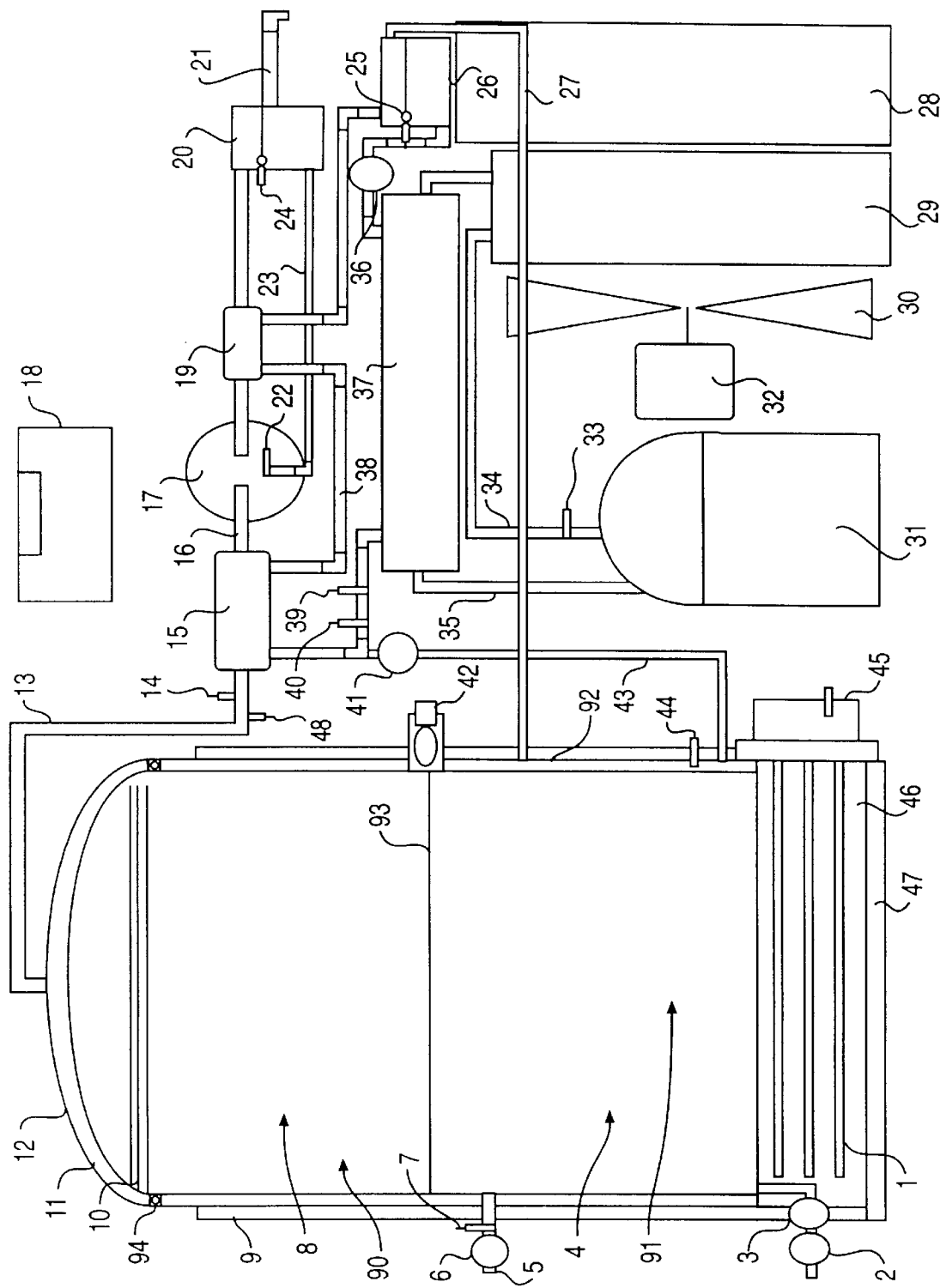
FIG. 1 shows a system diagram of the vacuum solvent distillation and recovery system according to a first embodiment of the present invention.

With reference to the figures, like reference characters will be used to indicate like elements throughout the several views. As shown in FIG. 1, the vacuum solvent distillation and recovery system 100, according to a first embodiment of the present invention, incorporates a heating element 1, a bilge pump 2, a bilge solenoid 3, a dirty solvent inlet 5, a dirty solvent inlet solenoid 6, a gauge pressure sensor 7, a boiling tank or vessel 9, a drift eliminator 10, insulation 11, a vessel lid 12, a distillate hose 13, a vapor temperature probe 14, a primary heat exchanger 15, a condensed solvent line 16, a vacuum pump 17, a control panel 18, a secondary heat exchanger 19, a solvent reservoir 20, a solvent outlet hose 21, a vacuum air intake line 22, a liquid ring 23, a solvent reservoir float 24, a thermal oil reservoir float 25, a refrigerant oil reservoir 26, a thermal oil expansion line 27, condensing coils 29, a fan 30, a compressor 31, a refrigerant low pressure sensor 33, a high pressure refrigerant line 34, a low pressure refrigerant line 35, a chiller circulation pump 36, a chiller tube bundle 37, refrigerant oil lines 38, an oil flow detecting switch 39, a chiller temperature probe 40, a quench solenoid valve 41, a vessel float switch 42, a quench line 43, a thermal oil sensor 44, a back-up safety thermostat 45, an insulation jacket 47, and a vacuum pressure sensor 48.

In this first embodiment, the tank 9 is a double wall cylindrical vessel having an inner diameter of 18 inches and an outer diameter of 20 inches. It is 24 inches in height and constructed of 300 series stainless steel. 400 series stainless may used to construct the tank 9 for handling the more corrosive halogenated solvents. The tank 9 is segregated internally between an upper cavity 90 and a lower cavity 91. The lower cavity 91 includes an outer cylindrical chamber 92 that lines the inner peripheral surface of the lower cavity 91 and that is used to contain a highly efficient mineral thermal oil, such as MultiTherm 503. The upper cavity 90 is impregnated with a ceramic fiber insulation (e.g., Bremier Refractory) rated to withstand up to 1200° Fahrenheit to help reduce exposing an operator to heat transfer via thermal radiation from exposed tank and lid areas.

A 6000 watt Industrial Incloy immersion heating element (for example, Gaumer Company Model No. A4F18N18N2ER) is used as the heating element 1 and is flange mounted to an 8×8×18 inch rectangular enclosure 46 immersing the element's rods in a bath of thermal oil. The enclosure 46 is contiguous with the chamber 92 whereby the thermal oil in the enclosure 46 may flow with the thermal oil in the chamber 92 of the tank 9. This reduces the amount of thermal oil required if the element 1 were merely mounted to the bottom of the cylindrical vessel of the tank 9. It also reduces the initial start-up time for solvent distillation. The entire system requires approximately 12 gallons of thermal oil, such as MultiTherm 503.

The entire tank 9 is wrapped with the insulation jacket 47. One example for the insulation jacket 47 is a 475° Fahrenheit insulation jacket filled with 1200° Fahrenheit ceramic fiber made by Flexin Manufacturing using Bremier Refractory ceramic fiber insulation.

The tank 9 houses a float switch 42 recessed and mounted horizontally at the segregation line between the upper and lower cavities 90, 91. One example for the float switch 42 is a 1½ inch explosion-proof stainless steel float switch rated to 475° Fahrenheit made by Murphy Company. The tank also houses a gauge pressure sensor 7 mounted in the tank 9 to monitor for positive pressure in the tank. One example for the gauge pressure sensor 7 is a Johnson Control Model PSO-5 switch that is non-incendiary and resistor-protected.

Opposite and just below the float switch 42, the dirty solvent supply line 5 is connected to the lower cavity 91 of the tank 9. The dirty solvent supply line 5 is connected to the tank 9 through a filter (not shown), the inlet solenoid 6 and a gauge pressure sensor 7. Dirty solvent enters the lower cavity 91 of the tank 9 within the fluid level limit 93 to ensure that volatile "misting" does not occur during a continuous operation. This volatile "misting" could potentially over-tax the drift-elimination and fractionation system during vacuum-assisted distillation of certain solvents. In this embodiment, the inlet solenoid 6 is an ASCO Red Hat model, ½ inch, high temperature (180° Fahrenheit) solenoid valve that is chemically resistant using Viton® seals. In addition, it is an explosion-proof, two-way valve that operates on 110 volts AC.

The upper rim of the tank 9 contains a channel 94 created to house, in this embodiment, a ½-inch diameter Viton® "O" ring encapsulated with Teflon® which forms an air-tight seal between the tank 9 and the lid 12.

The lid 12 is, in this embodiment, a 20 inch diameter domed stainless steel component that is double walled. There is a 2300° Fahrenheit ceramic fiber insulation 11 sandwiched between the two walls to prevent the areas of the lid 12 that are exposed to an operator from becoming dangerously hot during high-end solvent distillation. The dome shaped lid 12 creates a necessary void for incorporating a unique drift-elimination and fractionation system. When the lid 12 is opened, the drift-elimination and fractionation system is conveniently displaced, allowing the operator to easily inspect the tank 9 and its contents.

Figure 9:
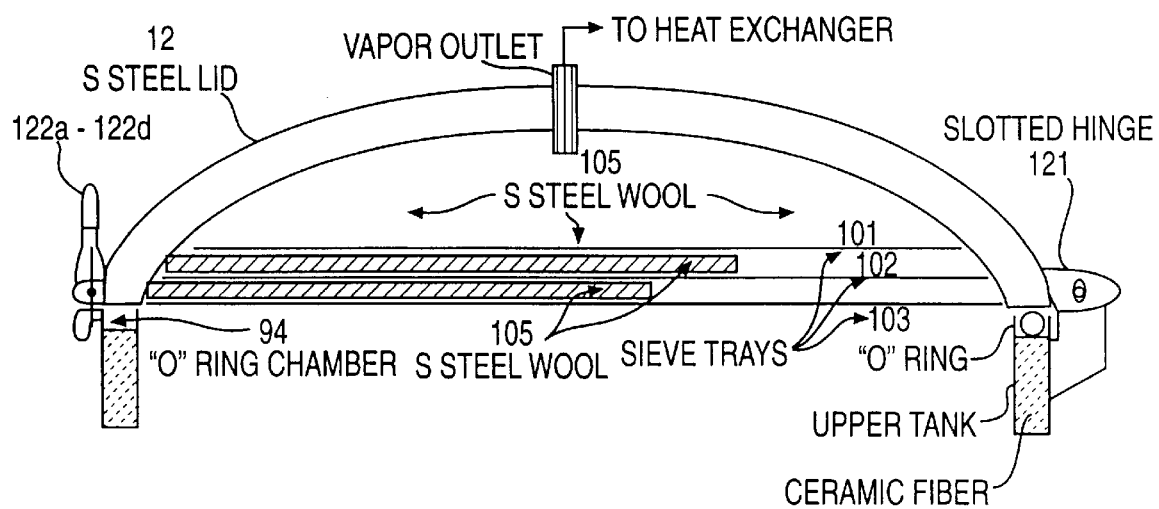
FIG. 9 shows a partial side cutaway view of the lid and hinge elements of the tank and of the drift eliminator in accordance with the first embodiment of the present invention.

As shown in FIG. 9, the lid 12 is spring-balanced using custom made Leeco stainless steel coil springs and firmly attached to the tank 9 by a purposefully slotted hinge 121. The slotted hinge 121 allows the lid 12 to pivot and adjust vertically thereby insuring proper seating. Otherwise, over and under compressions would occur adjacent and opposite the hinged area of the lid 12, respectively. The lid 12 is fastened securely to the tank 9 during operation by four, evenly spaced, stainless steel lever clasps 122a through 122d made by DESTACO.

Figure 10:
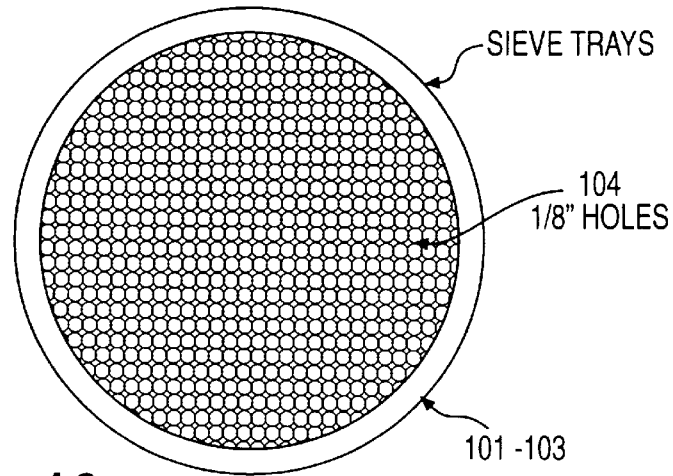
FIG. 10 illustrates an overhead view of a sieve tray from the drift eliminator in accordance with the first embodiment of the present invention.

The drift-elimination and fractionation system or drift eliminator 10, as shown in FIGS. 9 and 10, consists of three stainless steel discs 101 through 103, horizontally secured, and spaced ⅜ inches apart in the lid 12. ⅛ inch holes 104 are drilled one inch apart, square, on all three discs. The second disc 102 has its holes 104 staggered in alignment from the first and third discs 101, 103 creating a zigzag travel route. Stainless steel wool 105 is sandwiched between the three discs 101 through 103 completing the integrated drift-elimination and fractionation system.

In the lower cavity 91 of the tank 9, bilge pump 2 is connected to the tank 9 via a bilge solenoid 3. The bilge pump 2 is implemented in this first embodiment using a Jabsco Model 16370-1003 unit that incorporates a 24 volt DC motor with a 185° Fahrenheit Nitril impeller. This unit is a non-igniting commercial duty pump that operates on a brushless magnetic field. It pumps 5.8 gallons per minute at 20 feet of head and produces 8.7 psi of pressure. The bilge solenoid 3, like the dirty solvent inlet solenoid 6, comprises an ASCO Red Hat model, ½ inch, high temperature (180° Fahrenheit), chemically-resistant, explosion-proof, two-way solenoid valve that operates on 110 volts AC.

In the general operation of the system, heat from the heating element 1 and through the heating oil increases the temperature of the solvent until it vaporizes, thus leaving the majority of the contaminants behind. This normally occurs at about 100° Fahrenheit less than what the solvent would boil at atmospheric conditions due to the vacuum or negative pressure created by the vacuum pump 17. In this first embodiment, a vacuum pressure of 20 to −28.5 inches of Hg, depending on the vapor pressure of solvent in the liquid ring or solvent reservoir, is created in the tank 9. The vapor evacuates the tank 9 through the distillate hose 13 mounted on top of the lid 12. One example for the distillate hose 13 is a flexible all stainless steel braided outer hose that surrounds a solid stainless steel, ribbed hose (custom made by Fairmont Hose).

During this process, airborne mist particles and other contaminants of similar vapor pressures are generated. These particles are trapped and coalesce within the integrated drift-elimination and fractionation system or drift eliminator 10, allowing only the tiny vapor molecules to filtrate. The discs 101 through 103 serve as sieve trays allowing liquid to accumulate on the top surfaces, thereby stripping the vapor passing through the holes 104 of mist and contaminants. The stainless steel wool 105 not only coalesces small mist particles, but like the sieve trays, it also provides additional surface area for condensing and vaporization to promote higher solvent purity. As the liquid on the discs 101 through 103 and in the wool 105 loses heat due to the vaporization of the recovered solvent, the heating element 1 continually replenishes the heat by boiling the materials in the tank 9. This operation allows the system to maintain high degrees of purity for recovered solvents, even under rapid boiling conditions.

As the solvent vapor exits the distillate hose 13, it is circulated through the primary heat exchanger or condenser 15. Prior to entering the primary heat exchanger 15, the temperature of the solvent vapor in the distillate hose 13 is measured by the vapor temperature probe 14, and the vacuum pressure in the hose 13 and into the heat exchanger 15 is measured by the vacuum pressure sensor 48. The hot vapor is then drawn through tiny copper tubes (not shown) in the heat exchanger 15 by the vacuum pump 17. These copper tubes are surrounded by refrigerated oil circulating through the primary heat exchanger 15 that is the same as the thermal oil used with the heating element 1. The refrigerated oil surrounding the tubes initiates the removal of the latent heat from the solvent vapor, which is the first phase of the condensing process by vapor-to-liquid contact (tube and shell). In this embodiment, the primary heat exchanger 15 consists of an ITT Standard SX 2000 steel exchanger with copper inner tubes; it is a two pass (heads) type unit with 4.3 square feet of surface area. The primary heat exchanger 15 is supplied with refrigerant oil from the refrigerant oil reservoir 26. The temperature probe 14 is an Omega Type J (6 inch) thermocouple with a compression fitting. The vacuum pump 17 is a liquid-ring, explosion-proof vacuum pump (1 HP Sihi brand model LEM 20) that performs 50 Torr at −28.5 inches Hg at 3500 RPM with 4 CFM. The vacuum pressure sensor 48 is a Omega Pressure Transmitter, Model Number PX603-30VAC5V.

After being processed by the heat exchanger 15, the solvent vapor converts to a clean vapor/liquid mixture that then passes into the condensed solvent line 16 and through the vacuum pump 17 at a temperature cool enough to prevent any over-heating of the pump. The condensed solvent line 16 is a ⅞ inch OD refrigerant copper, Type K, rigid pipe with quick-connect compression fittings.

The final condensing occurs inside the vacuum pump 17. A vacuum pump 17, such as the liquid-ring vacuum pump in this first embodiment, is an excellent device for implementing direct contact heat exchange because it injects a constant stream of refrigerated solvent, and mixes that solvent with the vapor/liquid stream exiting the primary heat exchanger 15. After leaving the vacuum pump 17, the totally condensed vapor (liquid) then passes through a secondary heat exchanger 19 (also a tube and shell) which effectively chills the solvent because of the liquid-to-liquid heat exchange. The chilled solvent then travels to a clean solvent reservoir 20 where it can then gravity feed into a storage facility (not shown) through a solvent outlet hose 21 at a temperature cool enough to prevent unwanted VOC emissions. In this embodiment, the secondary heat exchanger 19 is implemented using a SSCF 2-inch single-pass unit by ITT Standard with 1.25 square feet of surface area. It is supplied with refrigerant oil from the refrigerant oil reservoir 26. The solvent reservoir 20 uses a stainless steel tank with a ¾ gallon capacity and fitted with SS couplings.

In this first embodiment, the secondary heat exchanger 19 is not intended to conduct any further condensing. It is primarily for removing the heat generated by the final condensing process that occurs in the vacuum pump 17, for removing the heat generated by the pump 17 because of the work being performed, and for chilling the exiting clean solvent to significantly reduce air emissions.

The liquid-ring vacuum pump 17 continually circulates in a supply of clean refrigerated solvent from the solvent reservoir 20 through a liquid ring make-up line (or liquid ring) 23 and vacuum air intake line 22. The pump 17 uses this fluid to aid in the condensing process, provide itself a sealant medium, and to cool itself during operation. This is especially important at the beginning and near the end of a distillation cycle, when there is little or no production of condensed solvent. If the system is operating, but there is little or no production, the liquid ring 23 may overheat the clean solvent reservoir supply, thus requiring the secondary heat exchanger 19 to perform the additional task of condensing the solvent in conjunction with the primary heat exchanger 15. The liquid ring 23 is implemented with a ⅜ inch, Type K, refrigerant copper, rigid pipe. The ⅜ inch vacuum air intake line 22 has a ¼ inch brass T valve having a 5/16 inch tubing check-valve made of polypropylene with a chemical and heat resistant Viton® diaphragm.

The operation of the liquid-ring vacuum pump 17 enables the system to have a "continuous feed" process capability. It maintains a negative pressure on the tank 9 and the solvent vapors, and a positive pressure on the clean condensed solvent line 16. This operational characteristic of the liquid-ring vacuum pump 17 is limited only by the amount of solvent that may be distilled at any one time, and by the amount of still-bottom residue that will build-up in the tank 9. Generally, the vacuum pump 17 is run continuously during either processing mode or during a quench cycle to ensure that positive pressures do not develop in the tank 9 at any time during distillation or quenching. As will be explained further, this operation also enables the system to purge the remaining fluids in the heat exchangers, and to allow the release of the lid 12 immediately after the quench cycle is complete.

As shown, the primary heat exchanger 15 operates under a continuous vacuum initiating the condensation of solvent vapor. A vapor/liquid mixture thus passes through the direct contact heat exchange vacuum system described above completing the condensing process. Liquid then passes through the secondary heat exchanger 19 utilizing liquid-to-liquid heat exchange to chill the clean solvent. This process significantly reduces air emissions, ensures total vapor condensing and increases operator safety.

Refrigeration for the system is implemented through a 20,000 BTU, indoor, closed-loop, chiller system. The chiller system includes the primary heat exchanger 15, the secondary heat exchanger 19, a chiller tube bundle 37 and the refrigerant oil reservoir 26. The secondary heat exchanger 19, the primary heat exchanger 15 and the chiller tube bundle 37 are connected in series to one another and to the reservoir 26 via refrigerated thermal oil lines 38. The refrigerated thermal oil lines 38 between primary heat exchanger 15 and the chiller tube bundle 37 incorporate a flow switch 39 for detecting the flow of refrigerated thermal oil, and a chiller temperature probe 40 for monitoring the temperature of the refrigerated thermal oil. Circulation of the refrigerated thermal oil between the various components is accomplished through a chiller circulation pump 36 that is connected between an outlet of the chiller tube bundle 38 and the inlet of the refrigerant oil reservoir 26. The reservoir 26 includes a refrigerated thermal oil reservoir float switch 25 for monitoring the presence of refrigerant oil in the reservoir 26.

The chiller tube bundle 37 is further connected between a compressor 31 and condensing coils 29 via low pressure Freon lines 35. The compressor 31 and the condensing coils 29 are connected to each other via a high pressure Freon line 34. The high pressure Freon line 34 includes a Freon low pressure sensor switch 33 for monitoring the pressure level of the Freon from the condensing coils 29 to the compressor 31. A fan 30 connected to a fan motor is positioned to cool the condensing coils 29.

In this first embodiment of the invention, R-22 refrigerant is used as the transfer medium, but may be replaced with the new environmentally safe R-134 refrigerant. The refrigerated thermal oil reservoir 26 in this embodiment has a capacity of 4 gallons. The refrigerant oil lines are formed using ⅞ inch OD copper, Type K, rigid, refrigerant oil transfer lines. The thermal oil reservoir float switch is a horizontal mount reed-type, ½ inch, male float switch. The chiller circulation pump 36 is Jabsco Model 16370-1003 unit that incorporates a 24 volt DC motor with a 185° Fahrenheit Nitril impeller. Like the bilge pump 2, the chiller circulation pump 36 is a non-igniting commercial duty pump that pumps 5.8 gallons per minute at 20 feet of head and that produces 8.7 psi of pressure. The chiller tube bundle 37 is an insulated HX-2 tube barrel rated for operation with a 24,000 BTU/hour system. The flow switch 39 is implemented with a Flow-Tech V6EPB for Hazardous Locations switch; the chiller temperature probe 40 is an Omega Type j (6 inch) thermocouple with a compression fitting.

The compressor 31 is implemented using an 18,000 BTU/hour capacity, hermetically sealed chiller compressor unit. The condensing coils 29 are the type used in an 28,000/hour BTU indoor chiller package. The low pressure Freon line 34 is formed from ⅝" Type K refrigerant copper while the high pressure Freon lines 35 are formed using ¼" Type K refrigerant copper. The fan 30 is based on a counter-rotating, 23° pitch fan blade with an interchangeable hub; the fan motor 32 is a General Electric® 1/12 HP, 1500 RPM, 110 VAC explosion-proof unit.

The chiller system as described above has four purposes. Three of its purposes are (1) removing the heat in the primary heat exchanger 15; (2) cooling the liquid-ring vacuum pump 17 via the secondary heat exchanger 19 to compensate for the condensing load and the work being performed; and (3) chilling the exiting solvent for air emission quality. In addition to these first three, the fourth purpose or function of the chiller system is to quench down the tank 9 and its associated distillation components at the end of production or during emergency shut-down.

In order to accomplish this fourth function, the chiller system further incorporates a quench solenoid valve 41 connected to a refrigerated thermal oil line 38 at an output of the primary heat exchanger 15. The quench solenoid valve 41 connects the refrigerated thermal oil line 38 to a quench line 43 that feeds into the cylindrical chamber 92 of the tank 9. A thermal expansion line 27 then feeds from the cylindrical chamber 92 back to the refrigerated thermal oil reservoir 26.

As noted above, the thermal oil used in the heating of the dirty solvent to be processed is the same as the thermal oil used in the refrigeration/chiller system. That particular structural and operational feature is very important in the present invention.

As the temperature of the thermal oil in the cylindrical chamber 92 and the enclosure 11 increases, it expands. This increased volume of thermal oil travels through the expansion line 27 and combines with the refrigerated thermal oil in the reservoir 26. Since these two oils are the same, the thermal oil from the cylindrical chamber 92 may be circulated as part of the refrigeration oil. The remainder of thermal oil used in the heating process maintains a segregated function from the refrigeration oil until a quench cycle begins.

When a quench cycle is initiated, either through ending production or an emergency shut-down, the quench solenoid valve 41 opens allowing the heating and refrigeration oils to mix and gradually merge through refrigerant oil entering the chamber 92, and eventually the enclosure 46 via the quench line 43. As these two systems combine, the hot thermal oil is slowly purged out through the thermal oil expansion line 27 and displaced by the cool refrigerated oil. The hot thermal oil enters and mixes inside the refrigerant oil reservoir 26 via the thermal oil expansion line 27. The chiller system removes the heat from this hot oil in combination with the refrigeration oil. This process continues until the temperature of the tank 9 and its contents have been lowered to a desired level. This process enables the system to cool down in an average time of 45 minutes, approximately 4 to 6 times faster than other conventional quench systems. When the quench cycle is complete, the oil capacities for the heating and cooling of the system are proportionately balanced, and the normal distillation process is ready to begin again.

As a result, the process actually displaces the heating oil gradually, and entirely, with the refrigerant oil. This allows the refrigeration of the heating oil to 50 degrees Fahrenheit in 45 minutes or less, 4 to 6 times faster than conventional systems. This is particularly beneficial in reducing "down time" for still-bottom removal or inner tank inspection, thus increasing the productivity in the distillation shift and preventing the possibility of VOC discharge caused by fluid or vapor residuals that were not otherwise chilled.

In this first embodiment, the quench line 43 is formed from ⅜ inch refrigerant copper, Type K, quench supply line with compression quick-connects. The thermal oil sensor 44 is an Omega Type J 6-inch thermocouple.

Figure 2:
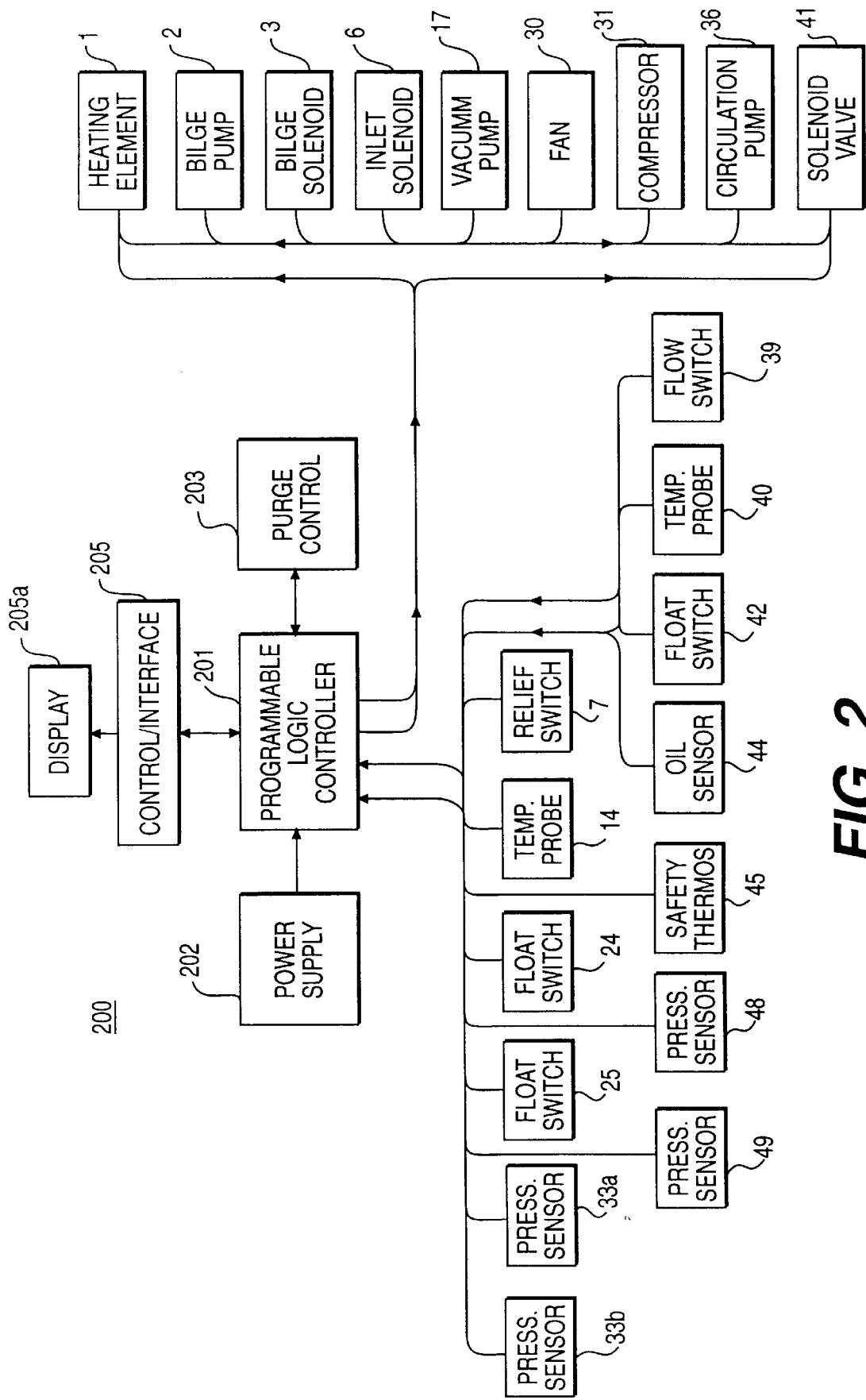
FIG. 2 illustrates a general block diagram of the control system for the present invention.

As shown in FIG. 2, the system controller 200 for the present invention generally incorporates a central processor device, such as a programmable logic controller (PLC) 201 used in industrial/manufacturing applications (in this case, a Modicon 110CPU 61200 PLC), a power supply circuit 202, a purge control system 203, and an operator control/interface device 205 that includes a display 205a. In the first embodiment illustrated in FIG. 1, the operator control/interface device 205 is implemented as the control panel 18.

In addition, the system controller 200 is operatively connected to the gauge pressure sensor 7, the temperature probe 14, the solvent reservoir float switch 24, the refrigerant oil reservoir float switch 25, the Freon low pressure sensor switch 33, the refrigerant oil flow switch 39, the chiller temperature probe 40, the float switch 42, the thermal oil sensor 44, the back-up safety thermostat 45 and the vacuum pressure sensor 48. Each of these devices provides a sensor input that the system controller 200 uses to monitor the status of the components of the overall system. The temperature probe 14 measures the temperature of the solvent vapor passing through the distillate hose 13. The solvent reservoir float switch 24 signals the system controller 200 when the clean solvent in the clean solvent reservoir 20 reaches a level of ¾ gallon. The refrigerant oil reservoir float switch 25 signals the system controller 200 when the amount of refrigerant oil in the refrigerated thermal oil reservoir 26 reaches 4 gallons. The Freon low pressure sensor switch 33 signals the system controller 200 when the pressure of the Freon flowing from the condensing coils 29 to the compressor 31 reaches a low pressure of <55 psiG. The refrigerant oil flow switch 39 signals when refrigerant oil is flowing from the chiller tube bundle 37 into the primary heat exchanger 15. The chiller temperature probe 40 generates a signal measuring the temperature of the refrigerated thermal oil flowing into the primary heat exchanger 15. The float switch 42 signals the system controller 200 when the dirty solvent inputted into the tank 9 reaches or falls below the segregation line between the upper and lower cavities 90, 91. The thermal oil sensor 44 measures the temperature of the thermal oil in the chamber 92. The back-up safety thermostat 45 measures the temperature of the heating element 1. The vacuum pressure sensor 48 measures the negative pressure of the vacuum generated in the system at the end of the hose 13 and into the heat exchanger 15. Lastly, the gauge pressure sensor 7 monitors for the presence of positive pressure in the tank 9.

The system controller 200 is further connected to control the heating element 1, the bilge pump 2, the bilge solenoid 3, the dirty solvent inlet solenoid 6, the vacuum pump 17, the fan 30, the compressor 31, the chiller circulation pump 36, and the quench solenoid valve 41. By receiving signal inputs from the sensors as described above, the system controller 200 is able to monitor the conditions detected by the sensors, and thereby control and/or adjust the operation of the overall system based on those signal inputs and depending on the particular stage of the overall system's operation. In particular, the system controller 200 is connected to the heating element 1 in order to control at least its activation/deactivation and/or the varying of the element's heat output level. The system controls the activation/deactivation of the bilge pump 2 for draining the tank 9. The bilge solenoid 3 is controlled by the system so as to selectively open/close the flow path from the tank 9 to the bilge pump 2 when draining the tank. The system controller 200 is connected to the dirty solvent inlet solenoid 6 so as to selectively fill the tank 9 with dirty solvent for processing. The system controller 200 controls the activation/deactivation of the vacuum pump 17, the fan 30, and the compressor 31. The chiller circulation pump 36 is controlled by the system to maintain the circulation of the refrigerant oil from the reservoir 26 into the chiller tube bundle 37. The quench solenoid valve 41 is controlled by the system for selectively opening/closing the flow of refrigerant oil into the chamber 92 during a quench cycle.

In this embodiment, the power supply circuit incorporates a U24Y500, 24 VDC, 5A power supply by Acopian, and a B24G210, 24 VDC, 2.1 A power supply by Acopian, in order to provide all the voltage and current levels required by the different components of the system controller 200 and the overall system 100 of the present invention.

The purge controller system 203 consists of a 1001A-LPS-C1-Z-PM purge control unit by Bebco; a EPV-1-PG-00, purge vent by Bebco, and a GPSK-2 purge loss switch also by Bebco. The purge controller system 203 maintains a positive pressure (0.25 inches of $H_2O$) on the Hoffman box and the operator control panel enclosure that contains arcing or contacting components to prevent the possibility of explosive vapors entering these enclosures.

The electrical components for implementing the above-described system controller 200 are generally selected so as to meet or exceed Class I, Division II, Group D Standards for Hazardous Locations, NFPA 30. In a preferred embodiment of the invention, a liquid crystal process control panel is used to implement the operator control/interface device 205. The components of the system controller 200 may be protected from the outside environment through the use of an enclosure 204 (see FIG. 1), such as a D3L30H2408LPB air-tight cabinet by Hoffman. In addition to the components of the system controller 200 as described above, the enclosure 204 may house the various relays, breakers, power supplies, terminal strips, and capacitors necessary for controlling the heating, vacuum, and refrigeration components of the overall system.

As described above, the overall system of the present invention is generally implemented using a central processor-based system controller. As one of skill in the art would understand, such a central processor-based device may be implemented using not only industrial programmable logic controllers, but also microprocessor-, personal computer-, minicomputer-, mainframe-, or computer network-type systems. Further, such central processor-based devices will require a software implementation of the process of the present invention to operate the structural implementation. The following is one example for the process that implements the present invention and that is applicable to the above-described embodiment.

Figure 3:
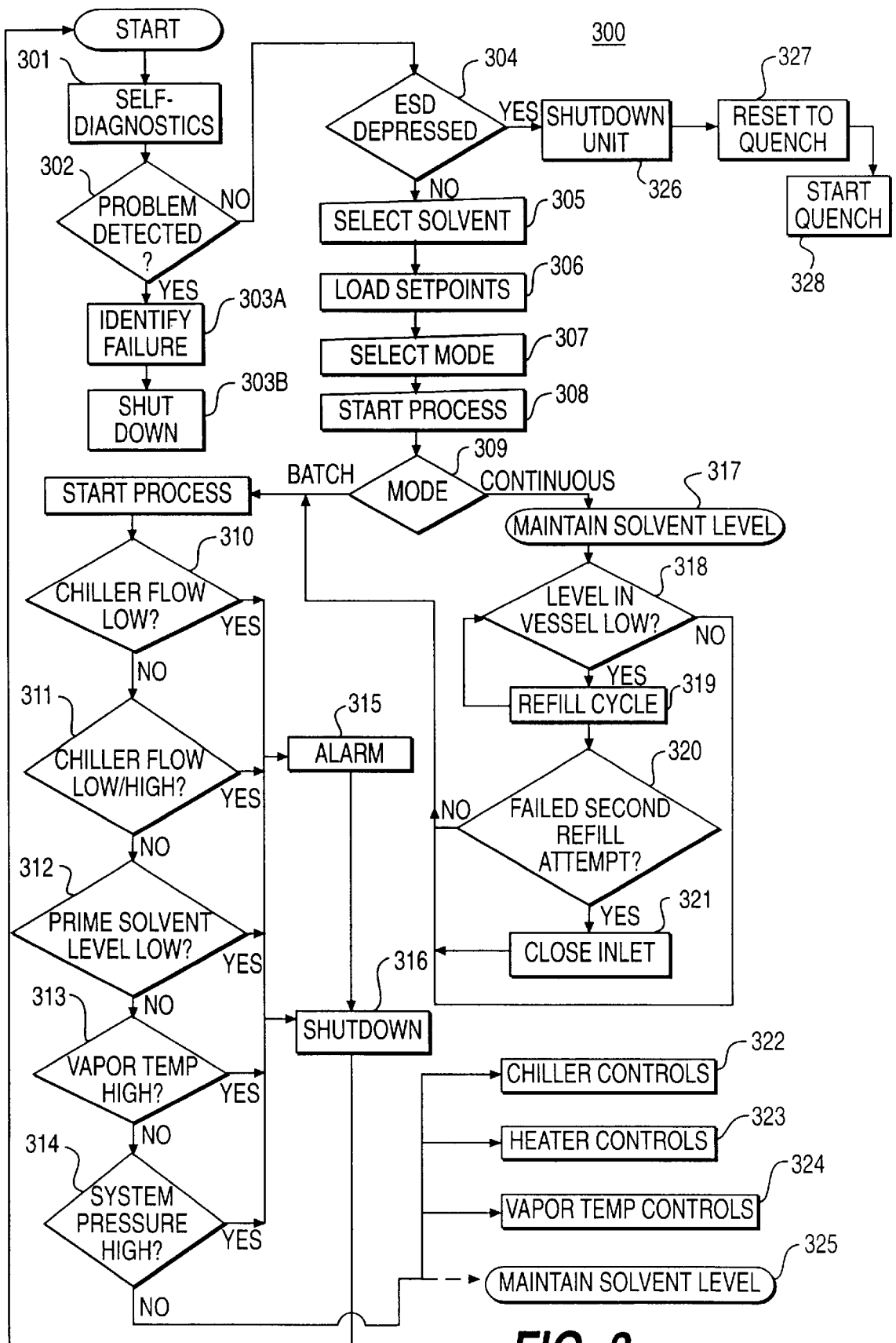
FIG. 3 shows a flow chart illustrating the main process cycle of the vacuum solvent distillation and recovery system according to the present invention.

As shown in FIG. 3, when the operation 300 of the overall system is initially started (i.e., power is supplied to the system), internal self-diagnostics are performed by the system controller 200 to ensure that all of the communication parameters within the operator control/interface device 205 and the system controller 200 itself are functioning properly (Step 301). In other words, the system controller 200 checks if all its external inputs and outputs are nominally operational. If a problem were to detected (Step 302), the system would initiate the necessary steps, if possible, to identify the hardware failure (Step 303A) and shut down (Step 303B) until corrective action is taken by the operator.

However, if no problems are detected at this start-up stage, then the system will then make an initial determination whether an Emergency Shutdown (ESD) state is present (Step 304). In one example embodiment of the ESD state applicable to the present embodiment of the overall system, the system controller 200 incorporates a hardwired ESD switch (not shown) that would be activated by a user (e.g., a red mushroom push/pull switch) in an emergency. Whenever the ESD switch is activated or depressed, a signal indicating the ESD state is sent to the system controller 200 that would order a shutdown of the overall system Step 326). Before the overall system can begin normal operation after an ESD state, the ESD switch must be reset and the overall system will be required to go through a quench cycle (Step 327), as will be explained further hereinbelow. Once the ESD switch is reset and the overall system is initialized, the actual quench cycle will begin (Step 328).

If an ESD state does not exist, then the system controller 200 will initiate a series of run-mode process stages to begin inputting data parameters. For example, the system controller 200, through the operator control/interface device 205, will query the operator to select a particular solvent to process (Step 305). For example, using the display 205a, the operator may be given a menu of several known solvents that may be processed by the overall system. Processing characteristics and parameters (e.g., vapor temperature, heating oil temperature) of all the solvents in the menu are stored in memory in the system controller 200, along with general operating parameters associated with the processing of all solvents or evaporative compounds, such as refrigeration operating limits.

When a solvent is selected by the operator, the system controller 200 then loads the processing characteristics/parameters of that solvent from memory as operation setpoints (Step 306). These operation setpoints include the maximum, minimum and/or optimal states that the system controller 200 monitors for in the overall system's processing of the selected solvent. For example, a heating oil temperature setpoint is the maximum temperature that the heating oil would be allowed to reach during processing due to the nature (e.g., volatility) of the selected solvent.

After a solvent has been selected, the system controller 200 may then query the operator to select a processing mode (Step 307). The overall system has the capability to operate in either a "batch" or "continuous" processing mode. In the "batch" processing mode, only the contaminated solvent contained in the vessel is distilled. The dirty solvent must be introduced into the tank or vessel 9 manually. This processing mode is suitable for when small quantities are being processed and dirty solvent storage facilities are not readily available.

In the "continuous" processing mode, dirty solvent is drawn automatically through the dirty solvent inlet 5 and the dirty solvent inlet solenoid 6. In one embodiment, the tank 9 is initially filled to its rated capacity whereby the vessel float switch 42 may detect changes in the level of solvent in the tank 9. As the distillation is occurring and the solvent is converted to vapor, a decrease in the solvent level (e.g., ½ to 1 gallon) detected by the vessel float switch 42 will signal the system controller 200 to open the inlet solenoid 6 and feed in more solvent. This mode is more suitable to applications where large quantities of solvent need to be processed, and adequate solvent storage facilities are available and can prevent the discharge of unwanted VOC emissions that occur when manually loading or pouring solvents (i.e., in a "batch mode" operation).

After the operator selects either the "batch" or "continuous" processing mode, the operator can then activate the distillation process (Step 308), wherein the system controller 200 initiates a "Start Process" control function (Steps 309 through 323). In this control function, if the "continuous" processing mode is selected (Step 309), the system controller 200 will initiate a cycle (Step 317) to maintain the dirty solvent level in the tank 9. First, the system controller 200 determine whether the level of solvent to be processed in the tank 9 is low (Step 318) based on the signals from the vessel float switch 42. If so, the system controller 200 will activate the inlet solenoid 6 to refill the tank 9 (Step 319). The system controller 200 will then re-check if the tank is being refilled accordingly (Step 318). If the system controller 200 detects that the tank 9 is not being refilled, the system controller 200 will attempt a second time to refill the tank 9 (Step 319), and re-check if the tank 9 is refilled. If the system controller 200 determines that the level of solvent in the tank 9 initially was not low (Step 318), or if the system controller determines that the tank 9 was properly refilled after the second attempt (Step 320), then the system controller 200 continues with the normal processing of distilling the solvent (Step 310).

Alternatively, if the system controller 200 determines that it was unable to fill the tank 9 after the second attempt (Step 320), the system controller 200 will shut off the inlet solenoid 6 sealing the tank 9 (Step 321), and "convert" to a "batch" processing mode to process any solvent that may be in the tank 9 (Step 310).

After the initial cycle (Steps 317 through 321) to maintain the solvent level in the tank 9 in the "continuous" processing mode or if the "batch" processing mode was selected, the system controller 200 performs a series of diagnostic check steps of the heating, vacuum and refrigeration components either connected to it or monitored by it to ensure their optimal operating conditions. Such conditions are determined by the sensor inputs the system controller 200 receives from the various sensors as described above. For example, the system controller 200 will check if the flow of refrigerant oil through the chiller system is below the minimum operating parameters (Step 310). The system controller will check if the temperature of the refrigerant oil in the chiller system exceeds the maximum operating parameters (Step 311). The system will check if the level of clean solvent in the solvent reservoir 20 is below operating parameters, such as ¾ of a gallon (Step 312). Also, the system will check if the temperature of the solvent vapor passing through the distillate hose 13 exceeds operating parameters (Step 313). Further, the system will determine if the pressure of the overall system exceeds the operating parameter of maintaining a minimum vacuum (e.g., zero pressure or negative pressure of −8" Hg) in the system based on signals from the vacuum pressure sensor 48 and/or of preventing the presence of a positive pressure in the tank 9 as determined by signals from the gauge pressure sensor 7 (Step 314). Examples of irregular conditions that may cause the overall system to fail any of the above checks include a faulty circulation pump 36, damaged lines in the chiller system, damaged lines to and from the compressor 31, damaged lines to and from the solvent reservoir 20, a damaged distillation hose 13, an improperly sealed lid 12, an improperly sealed inlet solenoid 6, low Freon pressure, low levels in reservoirs 20 and 26, and a compression high-temperature trip damaged vacuum pump or impeller.

Any irregular signal conditions from checking the operating conditions just described will generate an alarm (Step 315) that will be communicated to the operator via the display 205a of the operator control/interface device 205. Depending upon what type(s) of irregular conditions and how many such irregularities are detected, a shutdown of the overall system will be initiated (Step 316). Potentially damaging conditions in any of the components will prevent the operation of the distillation process until corrected.

If no irregular conditions are detected, the overall system will proceed with the distillation of solvent through the operation of the chiller controls, the heater controls and the vapor temperature controls (Steps 322, 323, 324). If the overall system is programmed to operate in the "continuous" processing mode, the system controller 200 will also conduct further solvent level maintaining cycles (Step 325).

Figure 4:
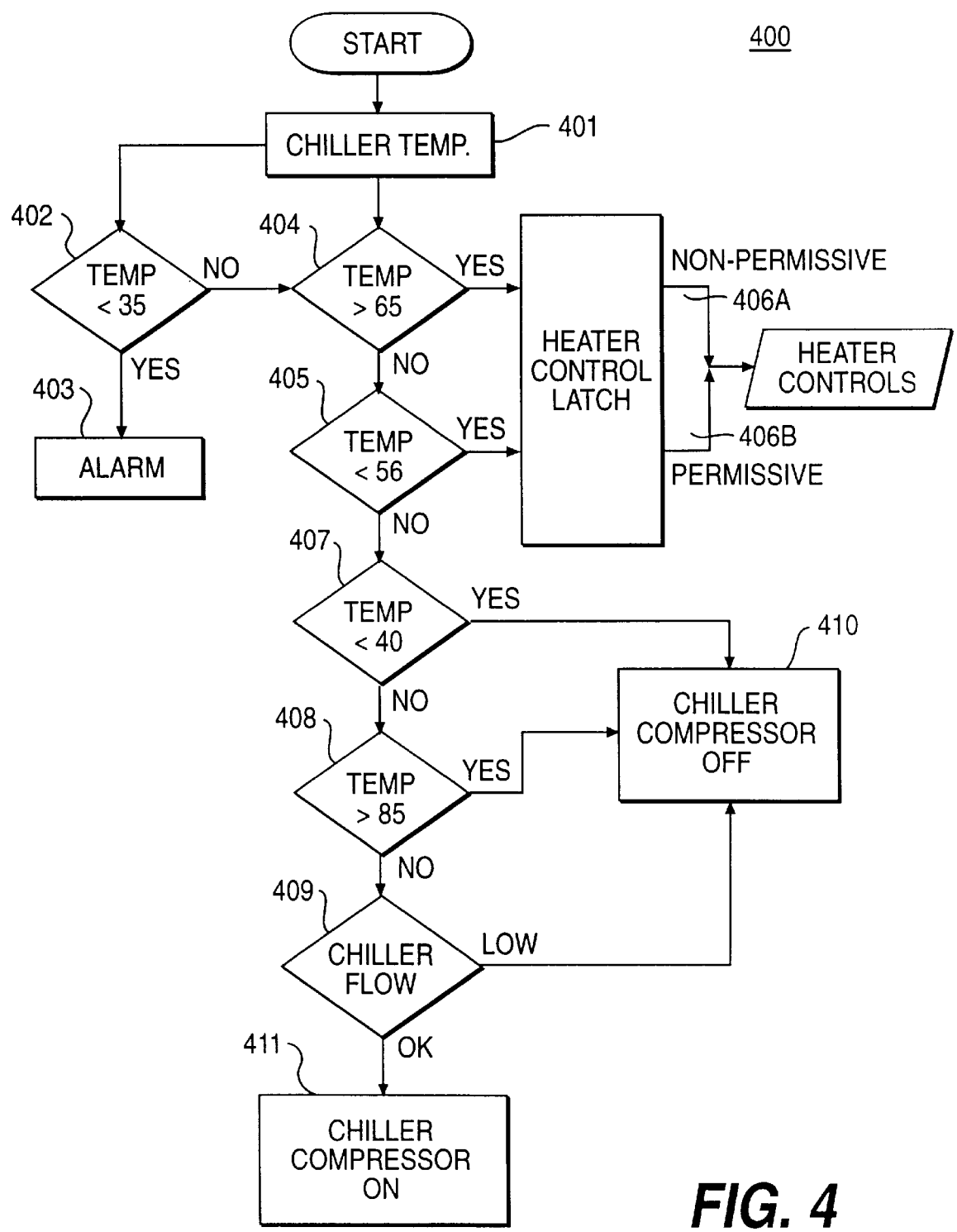
FIG. 4 shows a flow chart of the chiller control operation according to the present invention.

In the operation 400 of controlling the chiller system of the present invention as illustrated in FIG. 4, the temperature of the chiller system is measured (Step 401) via the chiller temperature probe 40. If that temperature is determined to be below the minimum operational parameter of, for example, 35° Fahrenheit (Step 402), the system controller 200 initiates an alarm that is communicated to at least the operator (Step 403). Such an alarm signal is indicative of the absence of solvent vapors in the heat exchange system, which in turn may be indicative of potential problems in, among other places, the tank 9 and the heating system. Otherwise, if the chiller system temperature is not below the minimum operational parameter, then the system controller 200 proceeds with comparing the measured chiller temperature with several other operational parameters that will determine the functioning of either the chiller system or the heater system.

In Steps 404 through 405, the system controller 200 compares the measured chiller temperature with the temperature range parameters of the chiller system for the particular solvent being processed. For example, if the measured temperature is determined to be above a maximum temperature parameter for a particular solvent (e.g., 65° Fahrenheit) (Step 404), then the system controller 200 generates signals to latch a "Non-Permissive" signal to the heater controls (Step 406A) indicating that the measured temperature of the refrigerant oil in processing a selected solvent is unusually high. Alternatively, if the measured temperature is determined to be below a nominal temperature parameter for a particular solvent (e.g., 56° Fahrenheit) (Step 405), then the system controller 200 generates signals to latch a "Permissive" signal to the heater controls (Step 406B) indicating that the measured temperature of the refrigerant oil is normal. The significance of the two types of signals will be explained further hereinbelow.

Next, the system controller 200 determines how the measured temperature compares with operating temperature parameters (Steps 407 through 408), and whether the flow of refrigerant oil through the chiller tube bundle 37 is low as determined by the flow switch 39 (Step 409), in order to operate the compressor 31. For example, if the measured temperature is below the nominal operating parameter (e.g., 40° Fahrenheit), or above the maximum operating parameter (e.g., 85° Fahrenheit), or if the refrigerant oil flow is low, the system controller 200 will shut down the compressor 31 (Step 410). The measured temperature being below the nominal operating parameter indicates that the chiller system is operating normally and that the compressor 31 need not be active to maintain operation. The measured temperature being above the maximum operating temperature of the refrigerant oil flow being low are both indicative of potential problems in the system, wherein the compressor 31 should be shut down to avoid damage to the overall system.

Otherwise, if the measured temperature does not exceed either operating temperature parameter and the refrigerant oil flow is sufficient (e.g., 1 to 4 gallons/minute flow/no flow), then the compressor 31 is activated or kept active (Step 411). During the distillation process, the operation 400 is repeatedly cycled in order to periodically activate and deactivate the compressor 31 to thereby maintain the refrigerant oil in the chiller system within the above-described operating parameters.

Figure 5:
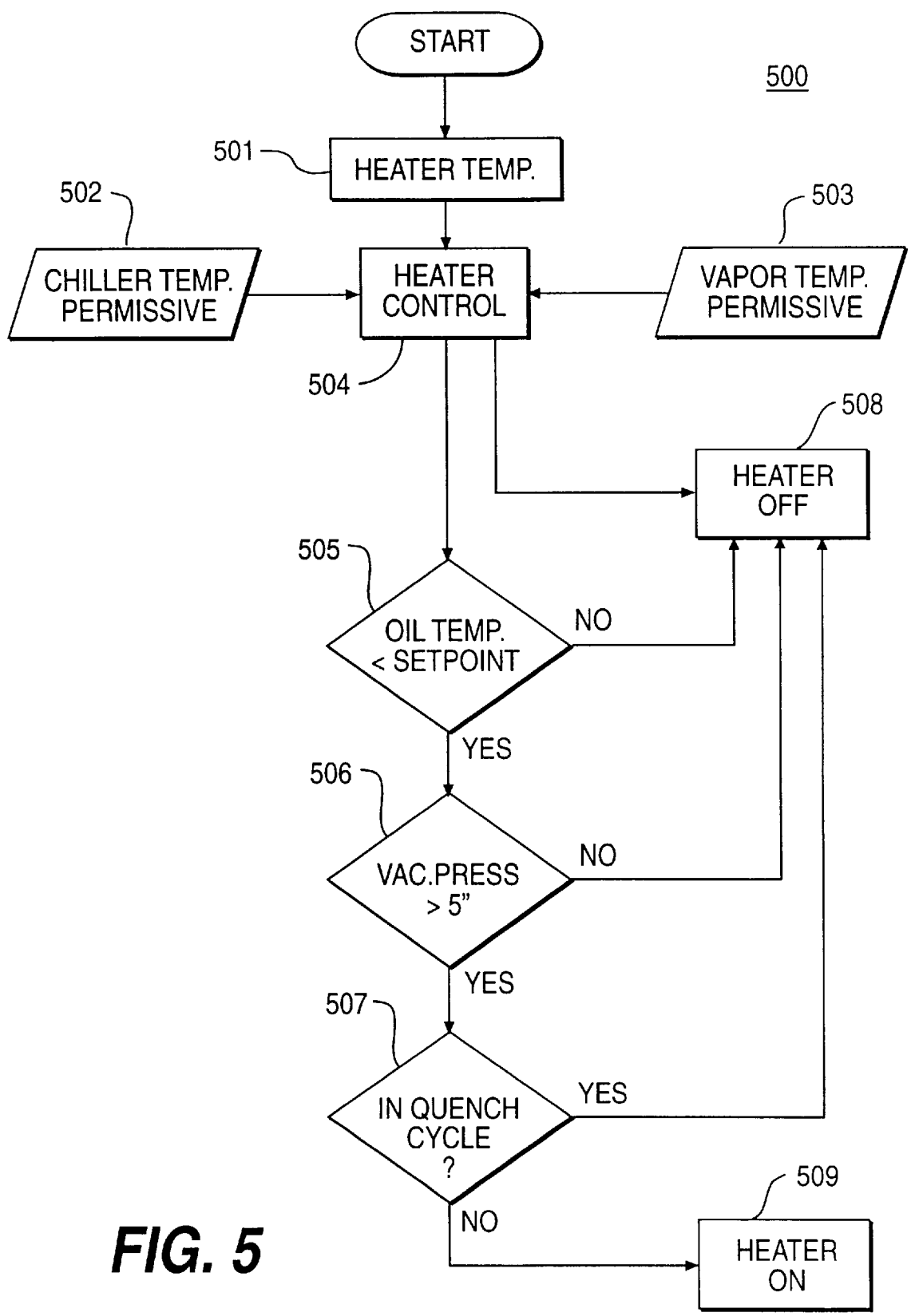
FIG. 5 shows a flow chart of the heater control operation according to the present invention.

In the operation 500 of the heating system as illustrated in FIG. 5, the temperature of the thermal oil in the heating chamber 92 is detected by the thermal oil sensor 44 (Step 501). As shown, the step of controlling the heating system (Step 504) is done in response to the system controller 200 determining either that the temperature of the refrigerant oil in the chiller system is permissibly within operating parameters (Step 502), as shown above, and/or that the temperature of the solvent vapor is permissibly within operating parameters (Step 503). As noted above, the temperature of the solvent vapor is determined via the temperature probe 14. If the temperature of either the refrigerant oil in the chiller system (Step 502), or the solvent vapor (Step 503) is determined to impermissibly exceed their respective operating parameters, then the control operation of the heating system will signal the shutting off of the heating element 1 (Step 508) indicating the existence of potential problems in and to prevent damage to the overall system.

Alternatively, the control operation (Step 504) of the heating system involves the steps of monitoring whether the thermal oil is kept lower than a known operating parameter or setpoint (Step 505), monitoring whether the vacuum pressure in the tank 9 is maintained at a minimum vacuum pressure parameter, for example −5 inches Hg, (Step 506) or determining whether the overall system is currently in a quench cycle (Step 507). If the thermal oil is kept lower than the known operating parameter or setpoint, or if the vacuum pressure in the tank 9 is maintained at the minimum vacuum pressure parameter or if a quench cycle is currently in operation, then the heating element 1 is shut down (Step 508). Otherwise, if all the opposite conditions are met, the heating element 1 is activated or kept active (Step 509). As with the chiller system and the compressor 31, the operation of the heating system is repeatedly cycled, whereby the heating element 1 is periodically activated and deactivated, thereby maintaining the thermal oil within the above-described operating parameters.

Figure 6:
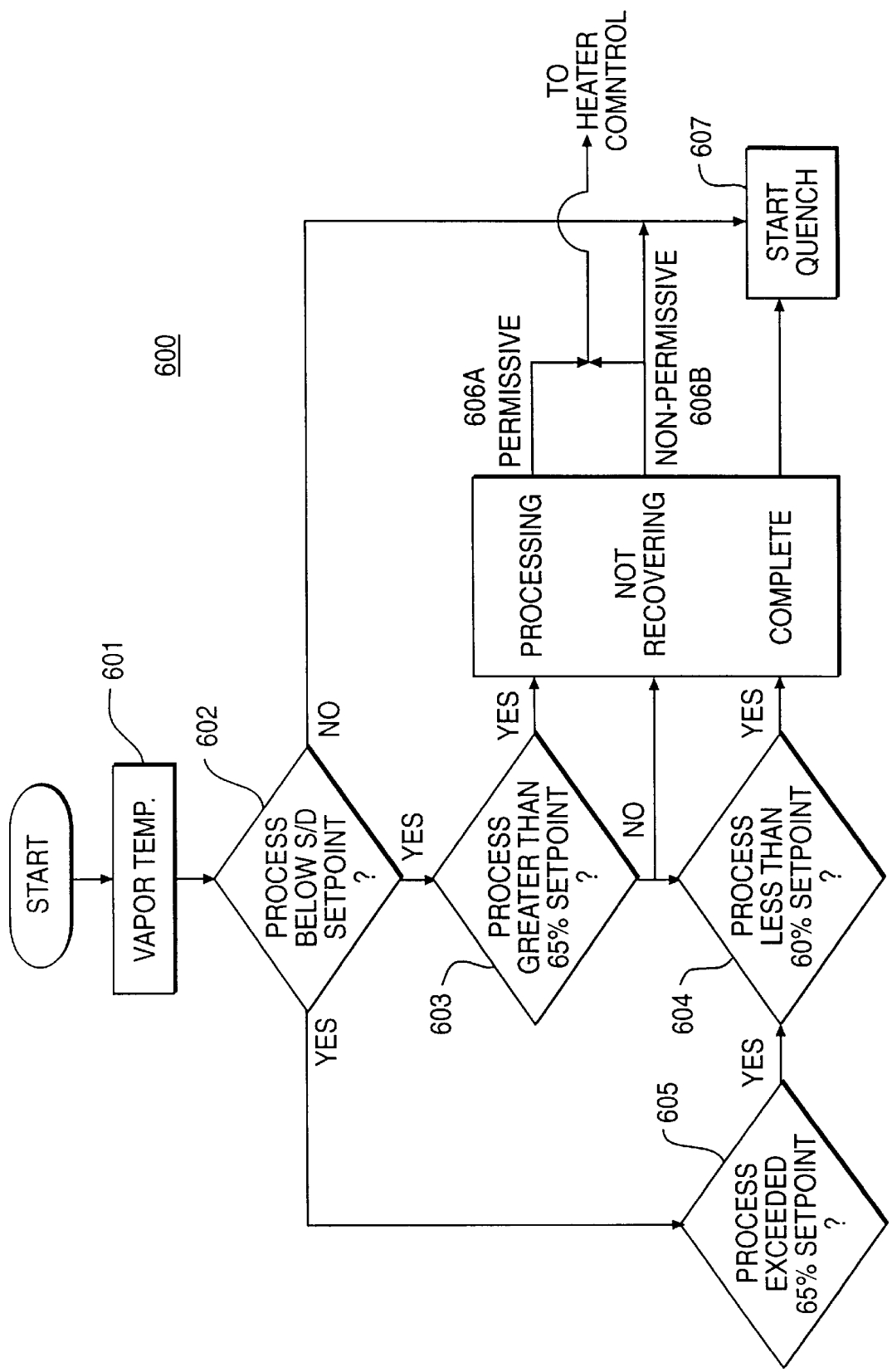
FIG. 6 shows a flow chart of the vapor temperature control operation according to the present invention.

In the operation 600 of the vapor temperature system controller as shown in FIG. 6, the temperature of the solvent vapor is determined (Step 601) via the temperature probe 14. The system controller 200 then determines whether the measured vapor temperature is lower than the shutdown (S/D) operating parameter or setpoint (Step 602) for the particular solvent being processed. If the measured vapor temperature is determined not to be below the S/D setpoint for that solvent (i.e., exceeds the S/D setpoint), then the system controller 200 will signal that an incorrect set of parameters for the solvent being processed was selected (i.e., the system is programmed for Solvent A, but Solvent B was fed into the tank 9) and automatically initiate a quench cycle (Step 607). This portion of the operation 600 is especially important when processing solvents that contain nitrocellulose or chlorine, since it allows the close monitoring of the vapor temperature of the solvent being processed.

Otherwise, if the system controller 200 determines that the measured vapor temperature is below the S/D setpoint, it will then further determine if the measured temperature exceeds or comes within a predetermined upper range of the S/D setpoint (Steps 603 and 605) calculated by the system controller 200, such as within 65% of the setpoint. For example, if the S/D setpoint is defined at 230° Fahrenheit, then 65% of that setpoint is 149.5° Fahrenheit. If the measured vapor is found to be within that predetermined range of the S/D setpoint (Step 603), then the system controller 200 will consider the overall system to be in a state of normal operation or processing (Step 606A) and then generate a "Permissive" signal for the operation of the heating system. If the measured vapor is not within that predetermined range of the S/D setpoint (Step 603), the system controller 200 will consider the overall system to be in a state of "Not Recovering" (Step 606B), wherein the measured vapor temperature is indicative of too low a temperature for distilling the particular solvent being processed. The system controller 200 in turn generates a "Non-Permissive" signal for controlling the heating system. This determination may also be used by the system controller 200 to signal the operator that potential problems may exist in the overall system.

Whether or not the measured vapor temperature exceeds the predetermined range of the S/D setpoint, the system controller 200 will then determine whether the measured vapor temperature falls below a second calculated predetermined lower range (e.g., 60%) of the S/D setpoint (Step 604). If the measured vapor temperature falls below this second predetermined setpoint, then the system controller 200 will consider the overall system as having completed the distillation process (Step 606C). After completion, the system controller 200 will then initiate a quench cycle (Step 607).

Figure 7:
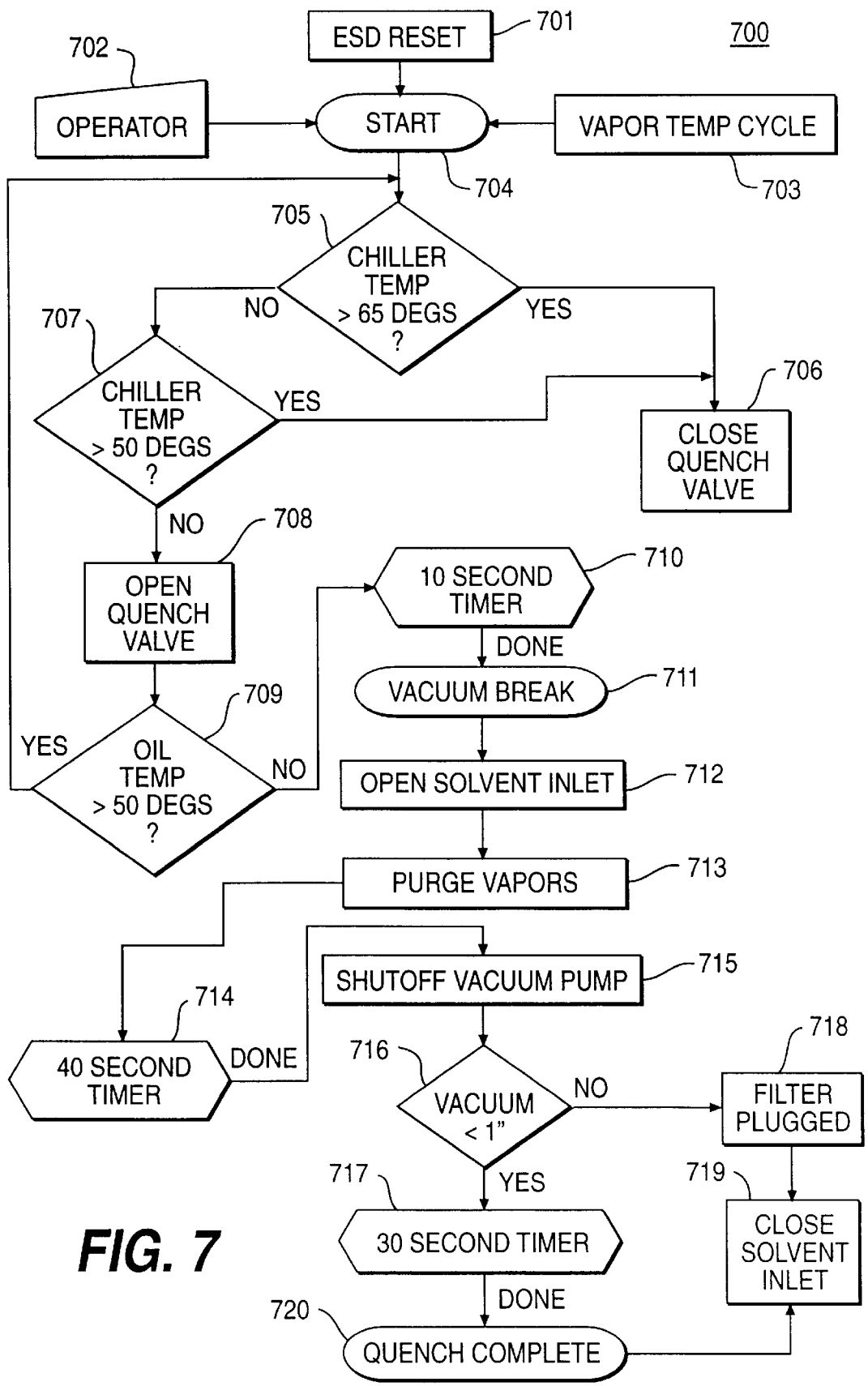
FIG. 7 shows a flow chart of the quench operation according to the present invention.

As shown in FIG. 7, the operation 700 of the quench cycle may be initiated by an emergency shutdown (ESD) reset signal 701, a signal from an operator 702 or by the operation of the vapor temperature cycle 703, as described above. As part of the start of the quench cycle, power to the heating element 1 is automatically disconnected (Step 704), in order that the thermal oil surrounding the tank 9 may be cooled to, for example 50° Fahrenheit. The thermal oil is cooled by incrementally introducing the thermal oil into the refrigerant oil of the chiller system. The system controller 200 determines whether the temperature of the refrigerant oil in the chiller system exceeds an upper operating parameter of, for example, 65° Fahrenheit based on the chiller temperature probe 40 (Step 705). If the temperature does exceed the upper operating parameter, then the system controller 200 closes the quench solenoid valve 41 (Step 706) to prevent the further introduction of thermal oil that may damage the chiller system.

If the temperature does not exceed the upper operating parameter, then the system controller 200 checks if that temperature exceeds a lower operating parameter of, for example, 50° Fahrenheit (Step 707). If the temperature does exceed that lower operating parameter, the system controller 200 will again close the quench solenoid valve 41 (Step 706) to prevent damaging the chiller system. In addition, the system controller 200 cycles the compressor 31 off whenever the temperature drops below 40° Fahrenheit. Otherwise, the system controller 200 will open the quench solenoid valve 41 (Step 708) allowing the thermal oil to mix with the refrigerant oil. The system controller 200 then determines whether the temperature of the thermal oil, as measured by the thermal oil sensor 44, exceeds a maximum cooling parameter of, for example, 50° Fahrenheit (Step 709). If the thermal oil temperature does exceed that operating parameter, then the system controller 200 will again check the temperature of the refrigerant oil to determine if it exceeds the upper operating parameter of 65° Fahrenheit (Step 705) and repeat the cycle of Steps 706 through 709. These steps will repeat until the thermal oil surrounding the tank 9 is cooled down to, for example, 50° Fahrenheit.

Otherwise, once the temperature of the thermal oil is sufficiently cooled, the system controller 200 initiates a timer (e.g., 10 seconds) prior to allowing the release of the lid 12 (Step 710). At the end of the timing period, the system controller 200 begins a vacuum break sequence (Step 711). In this sequence, with no solvent supply line connected, the inlet solenoid 6 is opened (Step 712) and the vacuum pump 17 is activated to purge any remaining vapors and liquid in the tank 9, the lines and the heat exchangers 15, 19 (Step 713). A timer is run for the period (e.g., 40 seconds) that the vacuum pump 17 is active for removing the vapors (Step 714). At the end of that period, the vacuum pump is then deactivated (Step 715), and the system controller 200 then determines whether the vacuum in the tank 9 is less than 1" Hg (Step 716) based on signals from the gauge pressure sensor 7. If the vacuum is effectively removed, the system controller 200 initiates another timer (e.g., 30 seconds) prior to allowing the opening of the lid 12 (Step 717). At the end of that timer period, the quench cycle is effectively completed (Step 720). If, however, the vacuum is not removed, the system controller 200 signals a warning that the filter (not shown) in the solvent inlet 5 has been blocked or plugged (Step 718), and closes the inlet solenoid 6 (Step 719).

Figure 8:
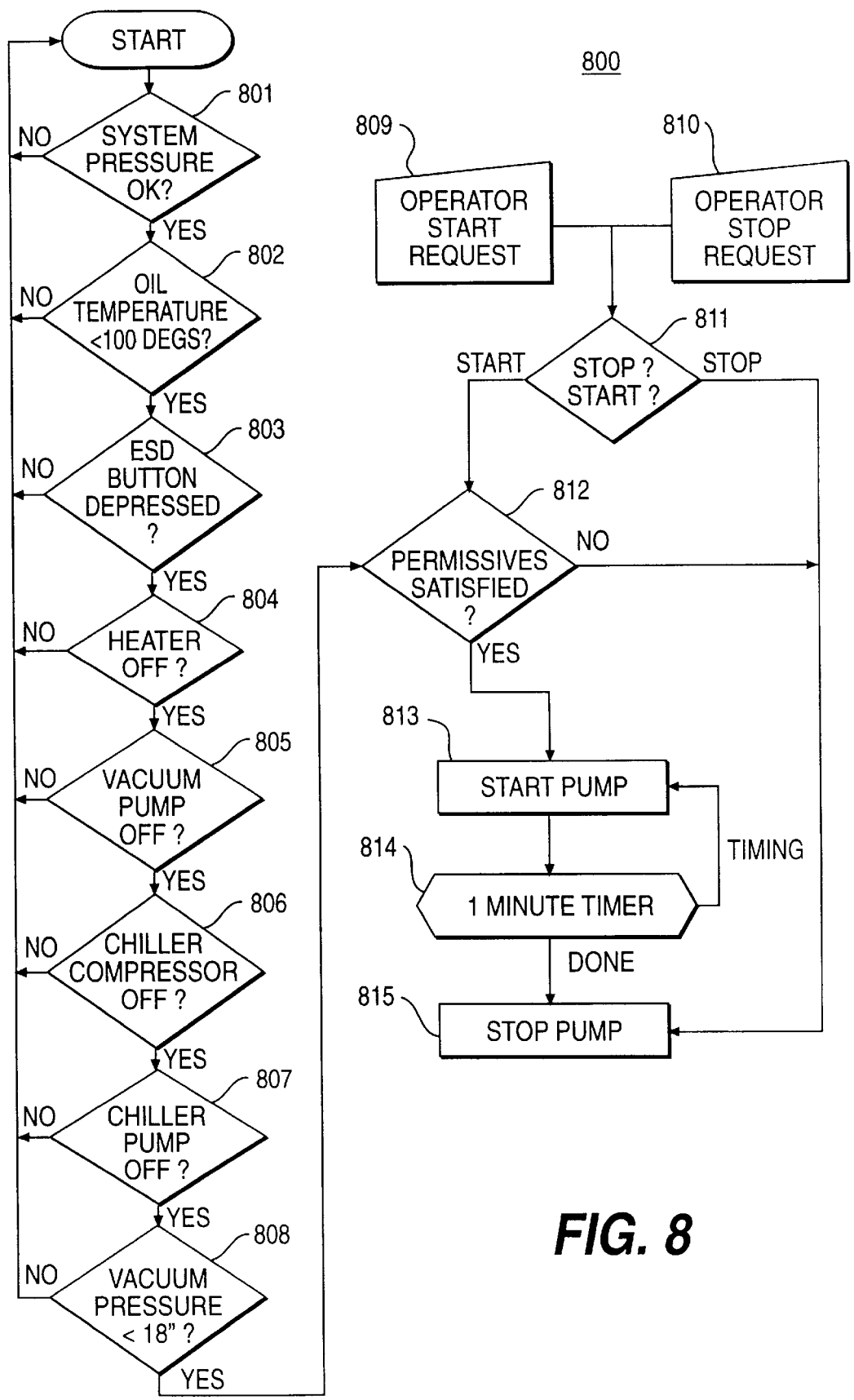
FIG. 8 shows a flow chart of the bilge operation according to the present invention.

The operation 800 of the bilge cycle shown in FIG. 8 is used to drain the tank 9 of solvent or any residues in the tank 9. Initially, the system controller 200 will make a series of determinations that will define the permissive parameters that will allow the operation of the bilge pump 2 and the bilge solenoid 3. As shown, those permissive parameters include determining whether the pressure in the overall system as measured by the gauge pressure sensor 7 is nominally a vacuum and not a positive pressure (Step 801), whether the temperature of the thermal oil as measured by the thermal oil sensor 44 is below the maximum parameter for a bilge cycle (e.g. 100° Fahrenheit) (Step 802), whether an emergency shutdown state exists as indicated by the ESD button Step 803), whether the heating element 1 is deactivated (Step 804), whether the vacuum pump 17 is deactivated (Step 805), whether the compressor 31 is deactivated (Step 806), whether the chiller circulation pump 36 is deactivated (Step 807), and whether the vacuum pressure in the tank 9 as determined by the vacuum pressure sensor 48 and/or the gauge pressure sensor 7 is less than 18" Hg (Step 808). If any of these determinations is negative, the system controller 200 starts over and repeats each determination.

Alternatively, if all determinations are in the affirmative, then the system controller 200 may consider all the permissive parameters for initiating a bilge cycle as having been met.

The bilge cycle is started or stopped by a signal from the operator (Steps 809, 810). The system controller 200 determines which type of command is received (Step 811) and routes its response accordingly. If the signal was to stop the bilge cycle, the system controller 200 will generate the signals to shut down the bilge pump 2 and deactivate the bilge solenoid 3 (Step 815). If the signal was to start the bilge cycle, the system controller 200 first determines whether all permissive parameters have been met (Step 812) as determined through Steps 801 through 808. If the parameters were not all met, again the system controller 200 will simply generate the signals to shut down the bilge pump 2 and deactivate the bilge solenoid 3 (Step 815).

If all permissive parameters were met (Step 812), then the system controller 200 activates the bilge pump 2 and bilge solenoid 3 (Step 813). The system controller 200 also initiates a timer (e.g., 1 minute) to count the time that the bilge pump 2 is active (Step 814). At the end of that timer period, the system controller 200 shuts down the bilge pump 2 and the bilge solenoid 3, completing the bilge cycle (Step 815).

Among the features of the overall system of the present invention as described above:

1) an operator has the ability to select from multiple solvents on the operator interface device 205. These solvents have pre-programmed set-points, eliminating the chance of inexperienced operator error;
2) the system controller 200 automatically terminates the heating process if a vacuum leak is detected, or if the lid 11 is improperly secured or left open. This prevents the possibility of dangerously elevated temperatures or the discharge of VOC's;
3) the system controller 200 can determine when production of clean solvent begins;
4) the system controller 200 can immediately determine when production ceases. This is extremely important when a specific level of still-bottom integrity is required, and also prevents the discharge of non-condensed vapors;
5) the system controller 200 can identify a solvent being distilled independent of the settings on or the selection made through the operator interface device 205. This can be extremely important if the operating parameters of the two solvents are dangerously different;
6) the overall system can safely recover solvents ordinarily too dangerous or difficult to distill;
7) the system controller 200 monitors filter system for cleanliness. This helps prevent unwanted production loss during a "constant feed" process mode;
8) the system controller monitors the availability of contaminated solvent. This too reduces the chance of unwanted production loss;
9) the overall system can implement controlled password entry to prevent tampering of the solvent set points;
10) the system controller can store data on which solvent is selected for distillation, allowing supervisory monitoring to prevent operator error;
11) the system controller automatically initiates the refrigerated quench cycle when production ends, or if irregular signal conditions occur. This provides an added layer of safety to the operation of the overall system and controls VOC emissions; and
12) the overall system through its automation provides a multitude of features for convenience, expediency, and operator safety.

Although the present invention has been fully described in connection with the preferred embodiment thereof with reference to the accompanying drawings, it is to be noted that various changes and modifications will be apparent to those skilled in the art. For example, specific components for the implementation of each of the various elements and systems of the present invention were cited above. Other components equivalent or similar to those cited, such as the pumps, switches, sensors and solenoids, may be substituted as would be understood by one of skill in the art. Other materials for the tank, the various hoses, the various oil lines and the thermal/refrigerant oil may be used, as would be understood by one of skill in the art. Such changes and modifications are to be understood as included within the scope of the present invention as defined by the appended claims, unless they depart therefrom.

What is claimed is:

1. A system for recovering contaminated solvents, comprising:

means for evaporating a contaminated liquid solvent to be recovered into a clean evaporated solvent, said evaporating means including a tank for holding the solvent to be recovered and a heat source for heating the solvent in said tank into evaporation;

means for condensing the clean evaporated solvent into a clean liquid solvent, said condensing means including a heat exchanger for cooling said clean evaporated solvent into condensation; and means for controlling operation of said evaporating means and said condensing means based on a type of the contaminated liquid solvent selected to be recovered, said control means including means for monitoring operating conditions of said evaporating means and said condensing means during recovery processing of said selected contaminated liquid solvent, wherein said control means further includes means for storing parameter data on different solvents for use in controlling the operation of said evaporating means and said condensing means, and an operator interface for selecting a solvent to be processed, whereby said control means uses parameter data from said data storing means on said selected solvent in controlling the operation of said evaporating means and said condensing means.

2. A system according to claim 1, wherein said evaporating means further includes means for separating contaminants from said contaminated liquid solvent during evaporation of said contaminated liquid solvent.

3. A system according to claim 1, wherein said monitoring means includes a first sensor for monitoring for the presence of a predetermined amount of contaminated liquid solvent in said tank, and said evaporating means further includes means for automatically refilling said tank to said predetermined amount of contaminated liquid solvent, said automatic refilling means being operatively connected to said control means, whereby said control means controls operation of said automatic refilling means based on the presence of said contaminated liquid solvent detected by said first sensor in said tank.

4. A system according to claim 1, wherein said monitoring means includes a second sensor for monitoring for the presence of a vacuum pressure in said tank, and said condensing means further includes a pump for pumping said clean evaporated solvent through said heat exchanger and for maintaining said vacuum pressure in said tank, said pump being operatively connected to said control means, whereby said control means controls operation of said pump based on the presence of said vacuum pressure detected by said second sensor in said tank.

5. A system for the vacuum distillation of contaminated solvents, comprising:

a tank for holding a liquid contaminated solvent to be processed;

a heating chamber surrounding said tank for heating said liquid contaminated solvent in said tank into an evaporated solvent, said heating chamber being filled with a first heat transfer fluid and having a heating element for generating heat to be transferred through said heat transfer fluid to said tank;

a drift elimination and fractionation device for separating contaminants out of said evaporated solvent from said tank;

a heat exchanger circuit for cooling said evaporated solvent from said drift elimination and fractionation device, said heat exchanger circuit having a second heat transfer fluid circulating therethrough;

a pump circuit operatively connected to receive said evaporated solvent from said drift elimination and fractionation device and to circulate said evaporated solvent through said heat exchanger circuit; and a control circuit operatively connected to at least said heating element and said pump so as to control operation thereof based on parameters of a solvent selected to be processed, said control circuit including a plurality of sensors for monitoring operating conditions of at least said tank, said heating chamber and said heat exchanger circuit, wherein said control circuit further includes parameter data memory for storing operating parameters for a plurality of solvents to be selected for processing, and an operator interface through which an operator may select operating parameters from said parameter data memory for a selected solvent to be processed.

6. A system according to claim 5, wherein said tank includes an inlet valve through which said contaminated liquid solvent is fed into said tank, and said plurality of sensors of said control circuit include a first level sensor for monitoring the presence of a predetermined amount of solvent to be processed in said tank, said control circuit being operatively connected to said inlet valve so as to control feeding of said contaminated liquid solvent into said tank based on said first level sensor.

7. A system according to claim 5, wherein said heat exchanger circuit includes at least a first heat exchanger, a heat transfer fluid reservoir for receiving said second heat transfer fluid out of said first heat exchanger, and a chiller circuit for cooling said second heat transfer fluid out of said reservoir and for inputting cooled second heat transfer fluid into said first heat exchanger.

8. A system according to claim 7, wherein said heat exchanger circuit further includes a chiller circulating pump operatively connected between said reservoir and said chiller circuit.

9. A system according to claim 7, wherein said heat exchanger circuit further includes a connecting conduit between said heating chamber and said reservoir and a quench valve between first heat exchanger, said chiller circuit and said heating chamber, and said plurality of sensors of said control circuit include a first temperature sensor connected to monitor a temperature of said first heat transfer fluid in said heating chamber, a second temperature sensor connected to monitor a temperature of said second heat transfer fluid out of said chiller circuit, said control circuit being operatively connected to said quench valve so as to selectively open and close said quench valve and thereby mix said first and second heat transfer fluids based on said first and second temperature sensors.

10. A system according to said claim 7, wherein said chiller circuit includes chiller tube bundle through which said second heat transfer fluid is circulated for cooling, a compressor for compressing a third heat transfer fluid to be circulated through said chiller tube bundle, and a condenser through which said third heat transfer fluid is cooled and circulated back to said compressor.

11. A system according to claim 10, wherein said chiller circuit further includes a first pressure sensor for monitoring a pressure of said third heat transfer fluid circulating through said chiller circuit, said first pressure sensor being connected between said condenser and said compressor, and said control circuit is operatively connected to said first pressure sensor and said compressor so as to control operation of said compressor based on at least said first pressure sensor.

12. A system according to claim 11, wherein said heat exchanger circuit includes a second temperature sensor connected to monitor a temperature of said second heat transfer fluid out of said chiller circuit, and said control circuit is operatively connected to said second temperature sensor so as to control operation of said compressor based on said first pressure sensor and said second temperature sensor.

13. A system according to claim 7, said heat exchanger circuit further includes a second heat exchanger operatively connected between said first heat exchanger and said heat transfer fluid reservoir, and said pump circuit includes a pump operatively connected to receive clean liquid solvent from said first heat exchanger circuit and input said clean liquid solvent through said second heat exchanger, and a solvent reservoir operatively connected to receive clean liquid solvent from said second heat exchanger, said pump being further connected to generate a vacuum pressure in said tank and said drift elimination and fractionation device.

14. A system according to claim 5, wherein said pump circuit includes a pump operatively connected to receive clean liquid solvent from said heat exchanger circuit and to generate a vacuum pressure in said tank and said drift elimination and fractionation device, and a solvent reservoir operatively connected to receive clean liquid solvent from said pump.

15. A system according to claim 14, wherein said solvent reservoir is further connected to re-circulate said clean liquid solvent back to said pump.

16. A system according to claim 14, wherein said plurality of sensors include a second pressure sensor operatively connected to monitor a vapor pressure of said evaporated solvent from said drift elimination and fractionation device to said heat exchanger circuit and a third pressure sensor operatively connected to monitor the presence of a vacuum pressure in said tank, and said control circuit is operatively connected to control activation of said system based on said second and third pressure sensors.

17. A system according to claim 5, wherein said drift elimination and fractionation device includes a plurality of sieve tray surfaces for accumulating contaminants, and a plurality of coalescing filters positioned between each of said plurality of sieve tray surfaces through which said evaporated solvent from said tank passes.

18. A system according to claim 17, wherein said plurality of sieve tray surfaces comprise a plurality of stainless steel discs vertically positioned relative to each other, each disc having a plurality of holes defined thereon, said plurality of discs being arranged such that holes of one of said discs are in staggered relationship with holes of discs above and below said one disc, and each of said plurality of coalescing filters comprises a stainless steel wool material.

19. A system according to claim 5, wherein said control circuit further includes a data processing circuit having means for processing data signals from said plurality of sensors and operating parameters from said parameter data memory, and means for generating control signals to at least said heating element, said heat exchanger circuit and said pump circuit.

20. A system according to claim 19, wherein said tank includes an inlet valve through which said contaminated liquid solvent is fed into said tank, and said plurality of sensors of said control circuit include a first level sensor for monitoring the presence of a predetermined amount of solvent to be processed in said tank, control signal generating means being operatively connected to generate control signals to said inlet valve so as to control feeding of said contaminated liquid solvent into said tank based on said first level sensor.

21. A system according to claim 19, wherein said heat exchanger circuit includes at least a first heat exchanger, a heat transfer fluid reservoir for receiving said second heat transfer fluid out of said first heat exchanger, a chiller circuit for cooling said second heat transfer fluid out of said reservoir and for inputting cooled second heat transfer fluid into said first heat exchanger, a connecting conduit between said heating chamber and said reservoir, and a quench valve between first heat exchanger, said chiller circuit and said heating chamber, and said plurality of sensors of said control circuit include a first temperature sensor connected to monitor a temperature of said first heat transfer fluid in said heating chamber, a second temperature sensor connected to monitor a temperature of said second heat transfer fluid out of said chiller circuit, said control signal generating means being operatively connected to generate control signals to said quench valve so as to selectively open and close said quench valve and thereby mix said first and second heat transfer fluids based on said first and second temperature sensors.

22. A system according to said claim 21, wherein said chiller circuit includes chiller tube bundle through which said second heat transfer fluid is circulated for cooling, a compressor for compressing a third heat transfer fluid to be circulated through said chiller tube bundle, a condenser through which said third heat transfer fluid is cooled and circulated back to said compressor, and a first pressure sensor for monitoring a pressure of said third heat transfer fluid circulating through said chiller circuit, said first pressure sensor being connected between said condenser and said compressor, and said control signal generating means is operatively connected to generate control signals to said first pressure sensor and said compressor so as to control operation of said compressor based on at least said first pressure sensor.

23. A system according to claim 19, wherein said heat exchanger circuit includes a second temperature sensor connected to monitor a temperature of said second heat transfer fluid out of said chiller circuit, and said control signal generating means is operatively connected to generate control signals to said second temperature sensor so as to control operation of said compressor based on said first pressure sensor and said second temperature sensor.

24. A system according to claim 19, said heat exchanger circuit further includes a second heat exchanger operatively connected between said first heat exchanger and said heat transfer fluid reservoir, said pump circuit includes a pump operatively connected to receive clean liquid solvent from said first heat exchanger circuit and input said clean liquid solvent through said second heat exchanger, and a solvent reservoir operatively connected to receive clean liquid solvent from said second heat exchanger, said pump being further connected to generate a vacuum pressure in said tank and said drift elimination and fractionation device, said plurality of sensors include a second pressure sensor operatively connected to monitor a vapor pressure of said evaporated solvent from said drift elimination and fractionation device to said heat exchanger circuit and a third pressure sensor operatively connected to monitor the presence of a vacuum pressure in said tank, and said control signal generating means is operatively connected to generate control signals to control activation of said system based on said second and third pressure sensors.

\* \* \* \* \*